United States Patent
Toth et al.

(10) Patent No.: US 6,543,965 B2
(45) Date of Patent: *Apr. 8, 2003

(54) UNDERWATER CABLE BRANCHING APPARATUS AND METHOD

(75) Inventors: John R. Toth, Clermont, FL (US); Ronald Gerald Wayne, Ormond Beach, FL (US)

(73) Assignee: Ocean Design, Inc., Ormond Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/944,490

(22) Filed: Aug. 30, 2001

(65) Prior Publication Data

US 2003/0044236 A1 Mar. 6, 2003

(51) Int. Cl.[7] ................................................. F16L 1/028
(52) U.S. Cl. ...................... 405/158; 405/169; 405/170; 439/201; 439/310; 439/8
(58) Field of Search ................................ 439/201, 310, 439/8; 405/158, 169, 170

(56) References Cited

U.S. PATENT DOCUMENTS

| | | | |
|---|---|---|---|
| 5,722,842 A | * 3/1998 | Cairns | 439/139 |
| 5,738,535 A | 4/1998 | Cairns | |
| 5,873,750 A | * 2/1999 | Carins et al. | 439/587 |
| 6,017,227 A | 1/2000 | Cairns et al. | |
| 6,315,461 B1 | * 11/2001 | Cairns | 385/56 |
| 6,402,539 B1 | * 6/2002 | Toth et al. | 439/367 |
| 6,431,912 B1 | * 8/2002 | Mori | 439/587 |
| 2002/0003931 A1 | * 1/2002 | Cairns et al. | 385/56 |

FOREIGN PATENT DOCUMENTS

| GB | 2101420 | * 1/1983 | H01R/13/523 |
|---|---|---|---|

OTHER PUBLICATIONS

Perry Joseph Wright, "Optical Fiber's Gigabit Bandwidth, 200 km Range Attractive for Subsea Work", Offshore, May 2000.

Stewart Barlow, "Advances in Undersea Connector Technology Improve Efficiency", Lightwave Special Reports, Oct. 1999.

* cited by examiner

*Primary Examiner*—J. J. Swann
*Assistant Examiner*—Katherine Mitchell
(74) *Attorney, Agent, or Firm*—Brown, Martin, Haller & McClain LLP

(57) ABSTRACT

An underwater cable branching apparatus has an elongate cable junction housing for positioning in line between two cables for installation underwater. The housing has through bores at each end for receiving the ends of respective first and second cables, and the cables are each terminated at a respective connector in the housing for releasably connecting the two cable ends together. Each connector is pivotally and retractably mounted in the housing by a respective pivotal linkage, such that the connectors can be separated and rotated upwardly out of the housing by an ROV for selective connection to other cables in an underwater network, to permit branching.

18 Claims, 6 Drawing Sheets

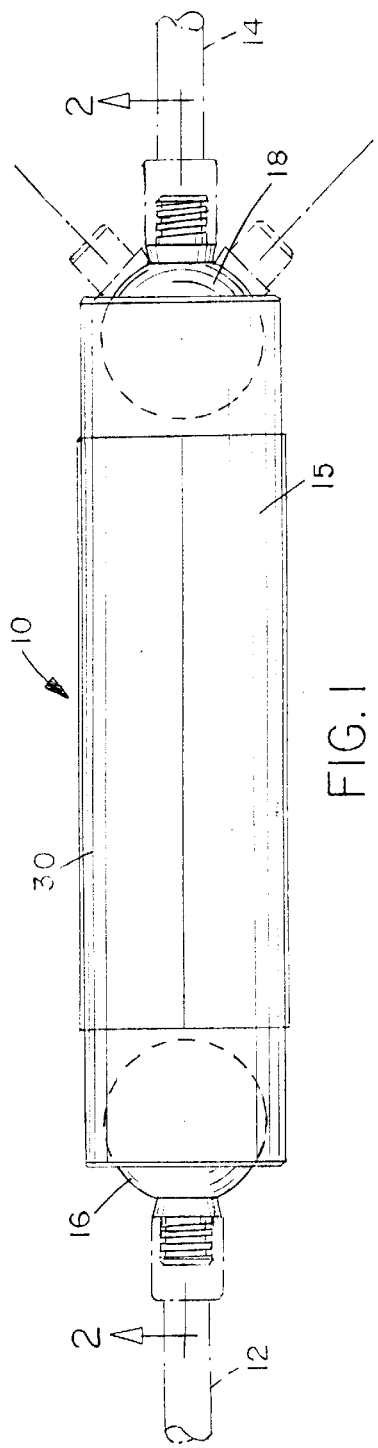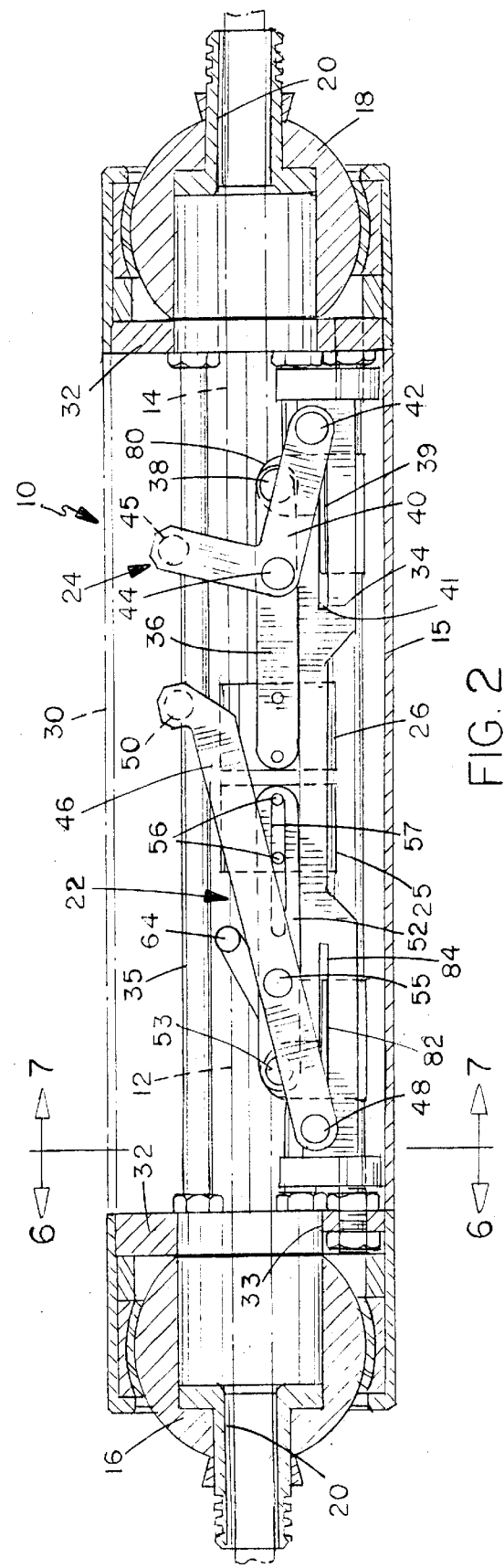

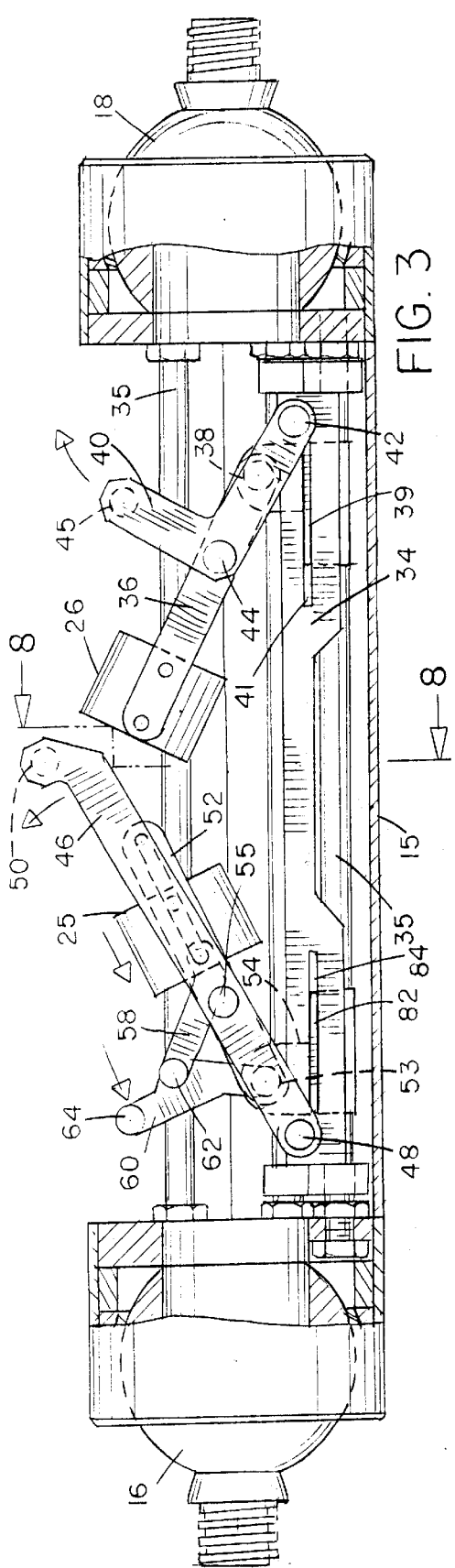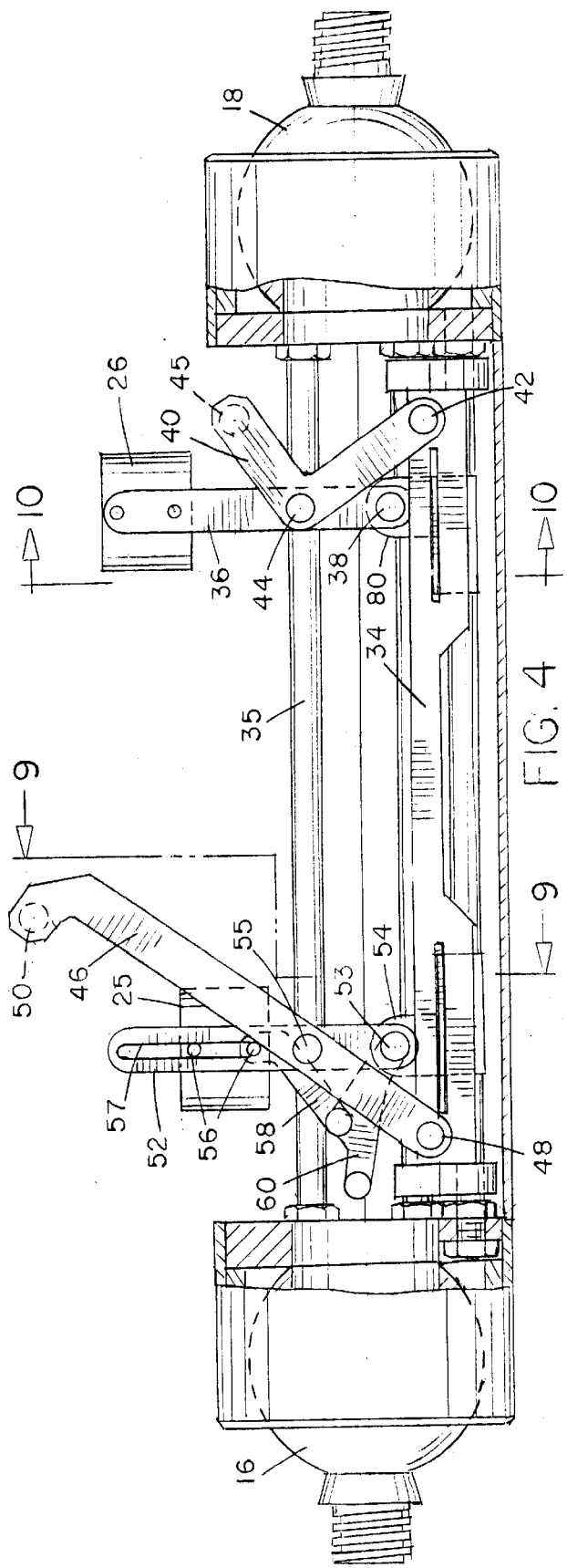

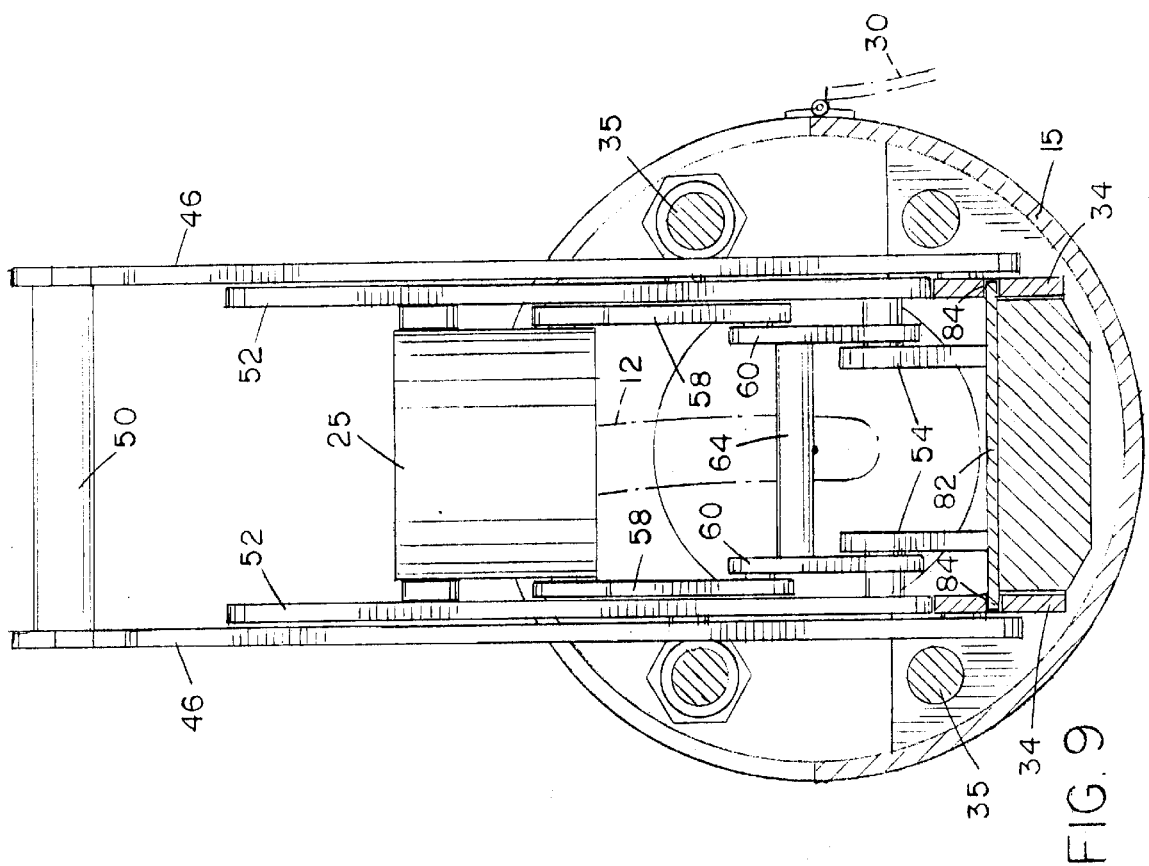
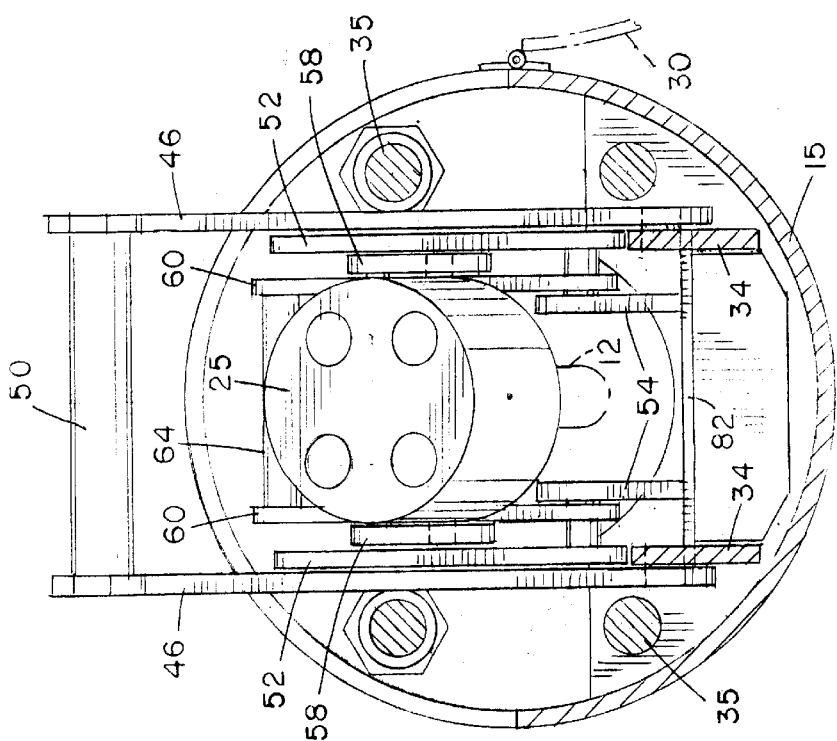

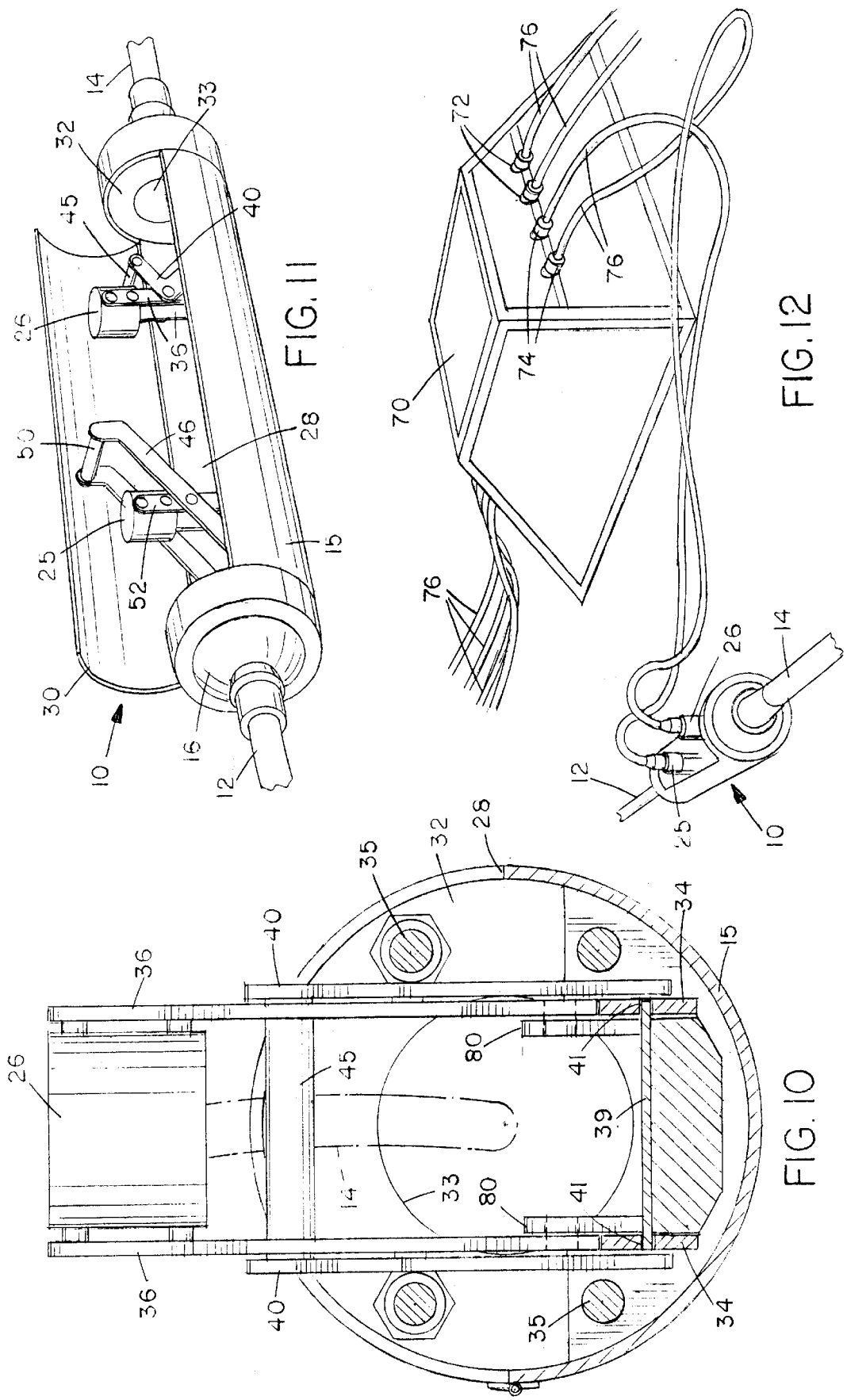

UNDERWATER CABLE BRANCHING APPARATUS AND METHOD

BACKGROUND OF THE INVENTION

The present invention relates generally to underwater electrical and/or fiber-optic cable systems, such as underwater telecommunication systems, and is particularly concerned with an apparatus and method for providing branching and re-distribution of circuits in such a system after installation.

Currently, it is very difficult to re-connect or re-distribute circuits when an electrical/optical cable system has been previously installed underwater, such as on the ocean floor. The present technology involves grappling and retrieval of cables from the ocean floor, such that they often have to be drawn up from several miles of ocean depth, and subsequently separated and re-terminated via splicing on board a cable laying ship, using ship-board facilities. This procedure is extremely laborious, time-consuming and expensive. Also, such procedures are very vulnerable to weather and ocean conditions, since storms or other inclement weather conditions can severely limit or jeopardize the successful completion of such operations.

SUMMARY OF THE INVENTION

It is an object of the present invention to provide a new and improved cable branching apparatus and method for an underwater electrical/optical cable system.

According to one aspect of the present invention, an underwater cable branching apparatus is provided, which comprises an elongate cable junction housing for positioning in line between two cables for installation underwater, the housing having a first junction at one end having a through bore for receiving the end of a first underwater cable and a second junction at the opposite end having a through bore for receiving the end of a second underwater cable, a pair of connectors in the housing for releasably connecting the end of the first cable to the end of the second cable, a connector mounting mechanism in the housing including a first pivotal linkage for moveably mounting the first connector for movement between a first position aligned with the second connector for connecting the first and second cable ends together in line, and a second position rotated upwardly and out of the housing for allowing the first cable end to be connected to another cable, and a second pivotal linkage for moveably mounting the second connector for movement between an extended, first position aligned with the first connector for connecting the first and second cable ends in line, and a second position rotated upwardly and out of the housing for connection of the second cable end to another cable, the housing having an upper opening for allowing rotation of said connectors out of the housing for re-connection to additional cables.

The housing may be provided with a door or doors for normally closing the upper opening, which can be opened by a remote oceanic vehicle or ROV when the connectors are to be separated and moved out of the housing. The connectors may be wet mateable underwater optical or electro-optical connectors which are designed for sealed, releasable underwater connection of electrical and/or optical fiber circuits in underwater cables. Suitable wet mateable connectors are described, for example, in U.S. Pat. Nos. 5,738,535 or 6,017,227 of Cairns, U.S. Pat. No. 6,315,461 of Cairns, or pending U.S. patent application Ser. No. 09/761,917 of Cairns et al. filed Jan. 17, 2001, the contents of each of which is incorporated herein by reference.

In an exemplary embodiment of the invention, a spherical or ball joint device is provided at each end of the housing for providing ready articulation of the cable entry. This provides a wide range of flexibility at the joint. The pivotal linkages may be associated with handles for gripping by an ROV in order to move the connectors in order to release the connection and move each connector into position for connection to another cable end connector.

The cable branching apparatus of this invention therefore permits multiple cable junction housings to be positioned over the length of a planned cable system, at any points where the joining of one or more branch cables may later be desired, months or even years after the initial installation. Later, at any location where branching is required, a separate junction box unit can be deposited on the sea floor adjacent the cable junction housing, the connector ends in the housing can be separated, and the junction box can be cable connected to the respective cable ends. All of these operations can be readily carried out at the ocean floor by a remotely operated underwater vehicle or ROV.

According to another aspect of the present invention, a cable branching system is provided which comprises at least one elongate connector housing for releasably connecting the ends of two underwater cables together, first and second cables extending into opposite ends of the housing and having end connectors releasably connected together inside the housing, a junction box having a first set of ports and a second set of ports, and an internal routing assembly for connected any selected port of the first set to a selected port of the second set, and third and fourth cables for selectively connecting a first port of the first set to the end connector of the first cable and a second port of the first set to the end connector of the second cable when the first and second cable ends are released.

The cable connector ends compries underwater mateable connectors, as described above, as do the junction box ports. Such connectors are capable of being mated or unmated while entirely submerged in sea water, while keeping the circuits completely sealed and protected from the surrounding water. These connectors retain their sealing capability even when submerged to oceanic depths of miles below sea level. The use of the cable junction apparatus and method of this invention greatly enhances the speed and efficiency with which sub-sea cable systems can be deposited, expanded and/or re-circuited.

According to another aspect of the present invention, a method of releasably joining cable ends and subsequently separating the cable ends and joining them into new circuits is provided, which comprises the steps of:

securing an end connector of a first underwater cable to a first pivotal linkage assembly inside a housing having an opening, the pivotal linkage assembly being movable to move the end connector between a lowered position in the housing and a raised position extending out of the housing;

securing an end connector of a second underwater cable to a second pivotal linkage assembly inside the housing, the second pivotal linkage assembly being movable to move the end connector between a lowered position in the housing, and a raised position extending out of the housing;

releasably securing the two end connectors together with the first and second pivotal linkage assemblies in the lowered position;

at a later date, disconnecting the end connectors and moving the second pivotal linkage assembly into a lowered, retracted position;

moving the first and second pivotal linkage assemblies into the raised position; and securing the end connectors of third and fourth underwater cables to the respective end connectors of the first and second cables.

The method and apparatus of this invention allows installation of branching devices along each line when laying a new, sub-oceanic cable network for telecommunications or the like. Subsequent branching and recircuiting can then be readily performed by an ROV on the ocean floor at any desired branching apparatus location. Further revisions can be made at a later date, whenever required, substantially increasing the flexibility and modification capabilities of such systems. The performance of modifications and additions on the ocean floor by an ROV will significantly reduce the hazards to both equipment and personnel, by avoiding the need to raise a previously laid cable through possibly miles of ocean depth onto a cable laying ship, and then separate and re-splice the cable on board the ship. Branching and re-circuiting operations, as well as initial installation, will be less vulnerable to adverse weather conditions which can otherwise cause substantial, and expensive, delays in such operations.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1 is a top view of a cylindrical branching unit according to an exemplary embodiment of the invention;

FIG. 2 is an enlarged sectional view taken on line 2—2 of FIG. 1;

FIG. 3 is a view similar to FIG. 2, with the connector mechanism partially extended;

FIG. 4 is a view similar to FIG. 3, with the mechanism fully extended;

FIG. 8 is a view similar to FIG. 7, with the mechanism in the position shown in FIG. 3;

FIG. 9 is a view similar to FIG. 7, with the mechanism in the position shown in FIG. 4;

FIG. 10 is an enlarged sectional view taken on line 10—10 of FIG. 4;

FIG. 11 is a perspective view of the unit with the mechanism extended; and

FIG. 12 is a view showing the unit connected to an underwater distribution device or junction box.

DETAILED DESCRIPTION OF THE DRAWINGS

Figure 5:
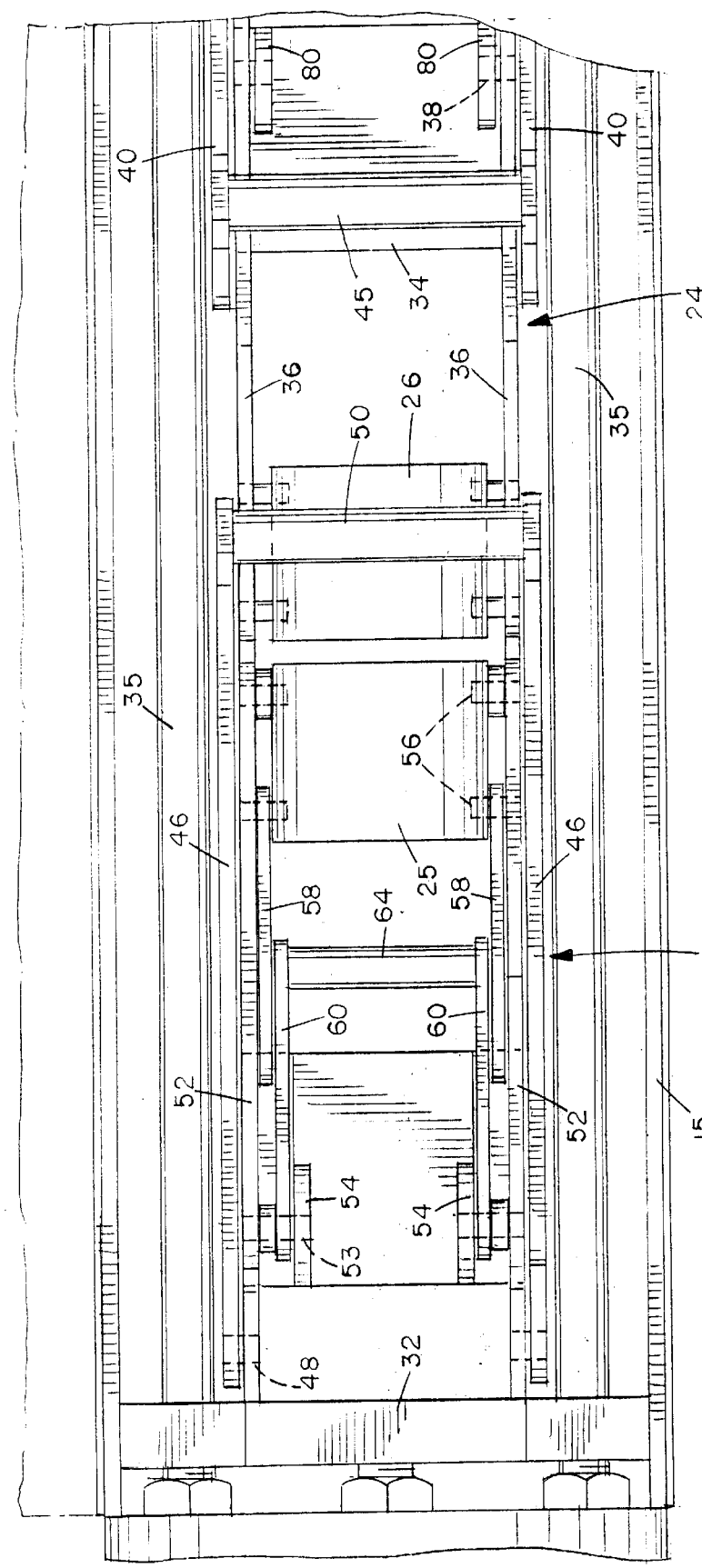
FIG. 5 is an enlarged top plan view of the unit with the cover open.
Figure 7:
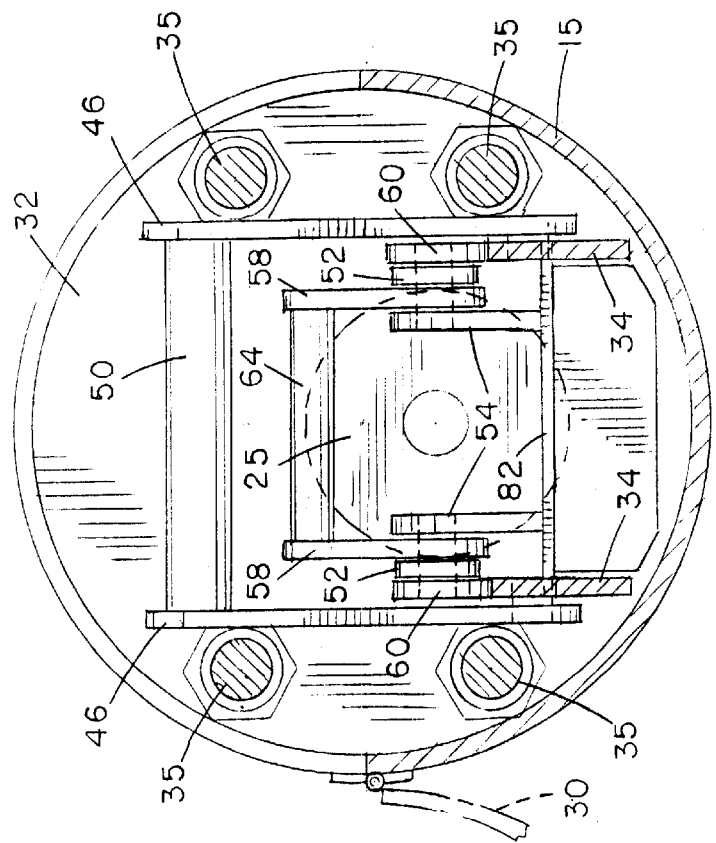
FIG. 7 is an enlarged sectional view taken on line 7—7 of FIG. 1.
Figure 6:
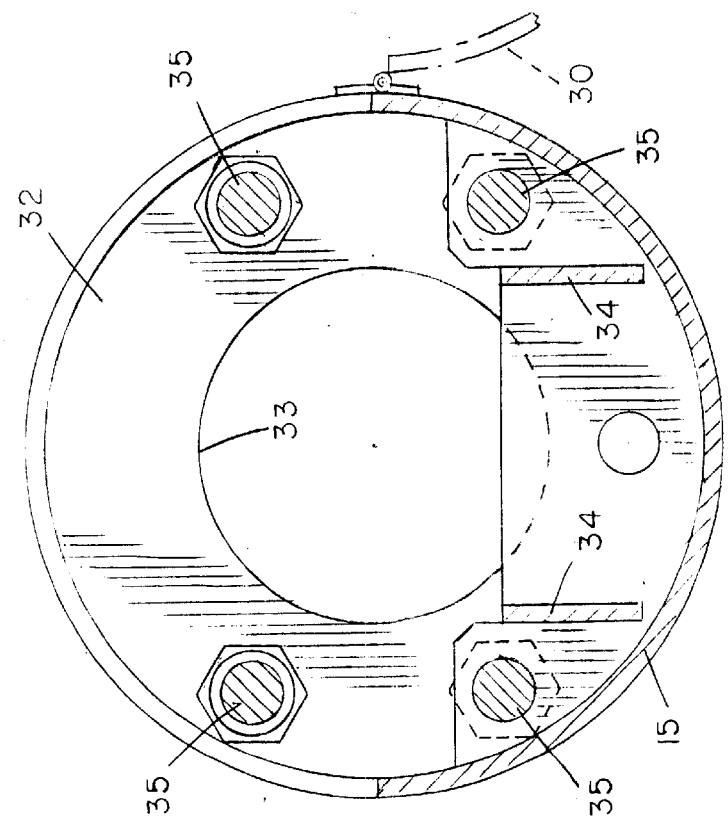
FIG. 6 is an enlarged sectional view taken on line 6—6 of FIG. 2.

The drawings illustrate a cable branching or re-distribution apparatus and method according to an exemplary embodiment of the present invention. FIGS. 1 to 11 illustrate a cable branching unit 10 for releasably connecting together two underwater electrical and/or fiber optic cables 12,14 forming part of an underwater cable network. The apparatus basically comprises a cylindrical outer housing 15 having a first swivel or ball joint 16 at one end and a second swivel or ball joint 18 at the opposite end, each swivel joint having a through bore 20 through which a respective cable 12,14 extends into the housing, and a pair of pivotal linkage assemblies 22,24 to which end connectors 25,26 at the ends of the respective cables are connected.

The outer cylindrical housing 15 has an upper opening 28 extending along a major portion of its length and around approximately 120° of its sectional diameter, and the opening 28 is normally covered by a hinged hatch 30, which can be pulled open by an ROV or remote oceanic vehicle, as indicated in FIG. 11. A frame assembly is mounted inside the housing for structural support of the pivotal linkage assemblies 22 and 24. The frame basically comprises a pair of end plates or bearing frames 32 adjacent opposite ends of the housing, each end plate having an opening 33 for passage of the respective cable, and a pair of rigid side rails 34 and a series of support rods 35 extending between the end or bearing plates 32. The pivotal linkage assemblies 22,24 are supported on the side rails 34.

The first pivotal linkage assembly 24 has first, spaced parallel link arms 36 each pivotally mounted on a respective side rail 34 via a first pivot 38 at one end, and secured to end connector 26 at its opposite end. A first base plate 39 is slidably mounted in slots 41 in the respective side rails, as best illustrated in FIGS. 2–4 and 10. Base plate 39 has a pair of spaced, upstanding ears or pivot support brackets 80 adjacent and spaced inwardly from the respective side rails, as best illustrated in FIG. 10. The first end of each link arm 36 is pivotally secured to a respective support bracket 80 via pivot 38, and the link arm 36 is therefore slidably mounted on the side rails 34. A second pair of spaced, parallel, generally. L-shaped link arms 40 are each pivoted to a respective side rail 34 via pivot 42 at a location spaced from first pivot 38, and are each pivoted to the respective first link arms 36 at location spaced between their ends via a third pivot 44 located at the corner of the L-shaped link. Each link arm comprises a pair of spaced, parallel members, as best seen in FIGS. 5 and 8 to 11, and the two members forming the L-shaped arm 40 are secured together at their free ends via a cross bar which forms a handle 45 for operating the pivotal linkage.

The pivotal linkage assembly 22 also comprises a plurality of link arms which each comprise a pair of spaced, parallel members, as best illustrated in FIGS. 2 to 5, 8, 9 and 11. The pivotal linkage assembly 22 is more complex than assembly 24, having four pairs of link arms 46,52, 58 and 60. The first or main link arms 46 are each pivoted at one end to the respective side rail 34 via pivot 48, adjacent end plate 32, and have a cross bar or handle 50 securing the free ends of the arms 46, as best illustrated in FIGS. 8,9 and 11. A second base plate 82 has opposite side edges slidably mounted in slots 84 in the side rails 34, and has a pair of upstanding, spaced pivot support brackets or ears 54.

A pair of second link arms 52 are each pivotally mounted at one end via pivot 53 on a respective support bracket or ear 54, and are each adjustably secured to end connector 25 at the opposite end. The second link arms are also pivotally connected to the respective first arms 46 via pivot pin 55 at an intermediate position in the length of both arms. End connector 25 is slidably mounted on the two link arms 52 via pins 56 extending in opposite directions from connector 25 into slots 57 in the link arms, as best indicated in FIGS. 3 and 4. One of the pins 56 on each side of connector 25 is also secured to the ends of a further pair of link arms 58 each having an angled end (see FIGS. 4 and 5). The opposite end of each link arm 58 is pivotally secured to a fourth link arm 60 via pivot 62. Link arm 60 is pivoted at one end to the same pivot 53 as link arm 52 on the base plate ear 54. The opposite ends of the fourth link arms 60 are connected by a cross bar forming a handle 64.

The apparatus of FIGS. 1 to 11 can be operated by an ROV on the ocean floor, without having to be raised-up to a vessel or ship in order to change or re-circuit any connections. The end connectors 25, 26 comprise mateable plug and receptacle units of a wet mateable underwater optical or electro-optical connector which is designed for sealed, releasable underwater connection of electrical and/or optical fiber circuits in underwater cables. Suitable wet mateable connectors are described, for example, in U.S. Pat. Nos. 5,738,535 or 6,017,227 of Cairns, U.S. Pat. No. 6,332,787 of Barlow, et al., U.S. Pat. No. 6,315,461 of Cairns or pending U.S. patent application Ser. No. 09/761,917 of Cairns, et al., filed Jan. 17, 2001, the contents of each of which is incorporated herein by reference. The cables are each terminated to a respective one of the connectors.

Initially, the two end connectors 25,26 are mated together for in-line communication between the circuits in cables 12 and 14, as indicated in FIGS. 2 and 5. Although a small gap is indicated between the connectors in these views, in practice there will be no visible gap between them once they are fully mated. In this position, both pivotal linkage assemblies 22,24 are in the lowered position, and the retractable connector 25 is in the fully extended position, with the pins 56 at the forward ends of slots 57. In the position illustrated in FIG. 2, the connector set is mated and locked within the enclosed cylinder. It should be noted that cylinder 15 does not have to be sealed against ingress of water, since the mated connector set is sealed and will remain sealed even at great ocean depths.

The underwater cable system will therefore be installed with a branching apparatus 10 as illustrated in the drawings at spaced locations throughout the network, depending on where future branching and/or redistribution is likely to be required. At a subsequent date, if branching or redistribution is required, an ROV will be dispatched to the appropriate branching junction 10. The ROV will be controlled to open the hatch 30, then to disconnect or de-mate the connector set 25,26, while pulling back on handle 64 in order to pull back link arm 58 and pin 56 so as to slide the connector back from the extended position illustrated in FIG. 2 to the retracted position illustrated in FIG. 3. Thus, as the ROV pulls handle 64 upwardly and rearwardly, the pivot linkage between arm 60 and arm 58 will act to also pull back arm 58 and the attached connector 25, so that pin 56 slides rearwardly along slot 57, as indicated by the arrow in FIG. 3.

The ROV will also grip and pull up the handle 50 of link arm 46, simultaneously pulling the link arm 52 and connector 25 into the raised, vertical position indicated in FIG. 4. The base plate 82 will slide along the slots 84 in the guide rails 34 in order to permit the movement of the pivot 53 as the pivotal linkage is moved between the retracted position of FIG. 2 and the vertical, extended position of FIG. 4. Once the connector 25 is in the deployed, vertical position, the ROV will pull the handle 45 of the pivotal linkage assembly 24 upwardly and rearwardly after the connectors are separated, as indicated by the arrow in FIG. 3, moving the link arm 36 and attached connector 24 upwardly through opening 28 so that the connector 24 extends out of the housing 15, along with connector 25. Again, the base plate 39 to which the pivotal link arms 36 are pivoted will slide along the side rail slots 41 to permit movement of the pivotal linkage into the vertical position, with link arms 40 pulling the pivot 38 rearwardly as the connector is extended. The two connectors 24 and 25 can now be connected to additional cables in order to re-direct signals or provide branch paths throughout the network. The raised, deployed and locked positions of the connectors 25 and 26 are illustrated in FIGS. 4 and 11.

As indicated in FIG. 12, the cables 12 and 14 may be re-circuited by joining apparatus 10 to an associated junction box 70, which may be connected to cables 12 and 14. Junction box 70 comprises an outer housing having a plurality of ports or cable landings 72 to which end connectors 74 of underwater cables 76 may be connected. Each port will have one part of a wet mateable underwater connector for releasable mating engagement with the other part of the connector mounted at the end of a cable 76. A suitable re-configurable signal router unit (not illustrated) in junction box 70 will be arranged to connect any port 72 to any other port on the junction box, so that any incoming cable may be selectively connected to any other cable secured to the ports 72. An underwater junction box suitable for use in this system is described in co-pending application Ser. No. 09/912,702 of Toth, et al., entitled "Sub-Oceanic Cable Network System and Method" filed on Jul. 24, 2001.

Once the end connectors 25,26 have been separated and moved into the deployed position, two additional cables 76 can be connected to the respective end connectors 25,26, while the opposite ends of each cable 76 is connected to a port 72 of junction box 70. Other ports will be connected to additional cables 76 extending away from the original cable line defined by the previously end-to-end connected cables 12 and 14. Thus, the primary cable installation can readily be linked to as many external branching cables as are needed.

As mentioned above, one of the end connectors 25,26 of cables 12,14 of the original cable network installation will comprise a plug unit of a wet mateable underwater connector, while the other end connector will comprise a receptacle unit. When these units are connected to the end connectors of additional cables 76 to be added to the network for branching or re-distribution purposes, clearly the receptacle unit must be secured to a plug unit on the respective cable 76, while the plug unit must be secured to a receptacle unit on another cable 76. Cables 76 may each be provided with a plug unit at one end and a receptacle unit at the opposite end, in which case some of the ports 72 will be receptacle units and other ports will be plug units. Alternatively, some of the cables 76 may be provided with the same connector unit, either plug or receptacle, at both ends, while others have a plug unit at one end and a receptacle unit at the other end. This will enable all of the ports of junction box 70 to incorporate the same type of connector unit, either plug or receptacle.

The branching unit of this invention can be readily installed at any appropriate locations between the ends of two transoceanic cables of a sub-sea cable communication network. Subsequent branching and re-circuiting can then be readily carried out by an ROV on the ocean floor, without requiring retrieval of the cables at their junction and re-splicing on board a ship, as was necessary in the past. All that the ROV is required to do will be to open the hatch and separate and pull up the two connectors, where they can be readily secured to new cable ends as required. This will considerably reduce the expense and inconvenience of branching and re-circuiting operations, and also increase the flexibility and modification capabilities of sub-sea communication networks.

Although an exemplary embodiment of the invention has been described above by way of example only, it will be understood by those skilled in the field that modifications may be made to the disclosed embodiment without departing from the scope of the invention, which is defined by the appended claims.

We claim:

1. An underwater cable branching apparatus, comprising:

an elongate cable junction housing for positioning in line between two cables for installation underwater, the housing having a first junction at one end having a through bore for receiving the end of a first underwater cable and a second junction at the opposite end having a through bore for receiving the end of a second underwater cable;

a first connector and a second connector in the housing for releasably connecting the end of the first cable to the end of the second cable;

a connector mounting mechanism in the housing including a first pivotal linkage for moveably mounting the first connector for movement between a first position aligned with the second connector for connecting the first and second cable ends together in line, and a second position separated from the first connector and rotated upwardly and out of the housing for allowing the first cable end to be connected to another cable, and a second pivotal linkage for moveably mounting the second connector for movement between a first position aligned with the first connector for connecting the first and second cable ends together in line, and a second position separated from the first connector and rotated upwardly and out of the housing for allowing the second cable end to be connected to another cable; and the housing having an upper opening for allowing rotation of said connectors out of the housing for re-connection to additional cables.

2. The apparatus as claimed in claim 1, wherein the housing includes at least one fixed rail extending longitudinally along at least part of the length of the housing, and each pivotal linkage includes a link member slidably mounted on the fixed rail for movement between an advanced position in which the respective connector is aligned with and adjacent the other connector, and a retracted position in which the respective connector is axially retracted to separate the connectors prior to movement of the pivotal linkage to move the respective connector into the second position rotated upwardly and out of the housing.

3. The apparatus as claimed in claim 1, wherein the housing has at least one door pivotally mounted in the opening for movement between a first position closing the upper opening, and a second, open position uncovering the opening.

4. The apparatus as claimed in claim 1, wherein one of said connectors comprises a plug unit of a wet mateable underwater connector and the other of said connectors comprises a receptacle unit of the underwater connector.

5. The apparatus as claimed in claim 1, wherein a ball joint device is provided at each end of the housing, each ball joint device having a through bore and the respective cables extending through the bore in the respective ball joint devices into the housing.

6. The apparatus as claimed in claim 5, wherein each ball joint device provide articulation of the respective cable entry into the housing through a range of up to 90 spherical degrees.

7. The apparatus as claimed in claim 1, wherein each pivotal linkage comprises a first link arm having a first end secured to the respective connector and a second end pivotally mounted in the housing, and a second link arm having a first end pivotally mounted in the housing, a second end comprising a handle, and a pivot device pivotally connecting an intermediate position on the second link arm to the first link arm, whereby pulling upwardly on the handle rotates the second end of the first link arm upwardly and out of the housing.

8. The apparatus as claimed in claim 7, wherein the second end of each first link arm is slidably mounted in the housing for movement between an advanced position in which the respective connector is aligned and positioned adjacent the other connector for connection thereto, and a retracted position in which the respective connector is axially retracted away from the other connector to permit the connectors to be disconnected.

9. The apparatus as claimed in claim 7, wherein said first connector is slidably mounted at the end of the first link arm for movement between an extended position at the end of the link arm and a retracted position spaced rearwardly from the end of the link arm, the first pivotal linkage further comprising an additional pivot link having a first end pivotally mounted in the housing, a second end comprising an additional handle, and an intermediate portion linked to said first connector for moving said first connector into said retracted position on movement of said additional handle in a predetermined direction.

10. The apparatus as claimed in claim 1, wherein the housing has a pair of end support plates adjacent opposite ends of the housing, and a pair of spaced, parallel side rails extending between the end support plates, the pivotal linkages being pivotally mounted on said side rails.

11. The apparatus as claimed in claim 10, including a plurality of support rods extending between the support plates within the housing.

12. A cable branching system, comprising:

at least one elongate connector housing for releasably connecting the ends of two underwater cables together;

first and second cables extending into opposite ends of the housing and having end connectors releasably connected together inside the housing;

a junction box having a first set of ports and a second set of ports, and an internal routing assembly for connected any selected port of the first set to a selected port of the second set; and third and fourth cables for selectively connecting a first port of the first set to the end connector of the first cable and a second port of the first set to the end connector of the second cable when the first and second cable ends are released.

13. The system as claimed in claim 12, wherein one of said connectors comprises a plug unit of a wet mateable underwater connector and the other of said connectors comprises a receptacle unit of the underwater connector, and said third and fourth cables each have cable ends comprising a respective unit of a wet mateable underwater connector for selective releasable connection to a respective cable end of one of the first and second cables.

14. The system as claimed in claim 12, wherein said housing has a connector mounting mechanism including a first pivotal linkage for moveably mounting the first connector for movement between a first position aligned with the second connector for connecting the first and second cable ends together in line, and a second position separated from the first connector and rotated upwardly and out of the housing for allowing the first cable end to be connected to another cable, and a second pivotal linkage for moveably mounting the second connector for movement between a first position aligned with the second connector for connecting the first and second cable ends together in line, and a second position separated from the second connector and rotated upwardly and out of the housing for allowing the second cable end to be connected to another cable, the housing having an upper opening for allowing rotation of said connectors out of the housing for re-connection to said third and fourth cables.

15. A method of releasably joining cable ends and subsequently separating the cable ends and joining them into new circuits, comprising the steps of:

securing a first end connector of a first underwater cable to a first pivotal linkage assembly inside a housing having an opening, the pivotal linkage assembly being movable to move the end connector between a lowered position in the housing and a raised position extending upwardly out of the housing;

securing a second end connector of a second underwater cable to a second pivotal linkage assembly inside the housing, the second pivotal linkage assembly being movable to move the second end connector between a lowered position in the housing and a raised position extending upwardly out of the housing;

releasably securing the two end connectors together with the first and second pivotal linkage assemblies in the lowered position;

installing the housing and cables on the ocean floor as part of a sub-sea communication network;

at a later date, disconnecting the end connectors and moving the the first and second pivotal linkage assemblies to raise the end connectors into the raised position while the housing remains on the oceanic floor; and securing the end connectors of third and fourth underwater cables to the respective end connectors of the first and second cables.

16. The method as claimed in claim 15, including the step of retracting at least one of the end connectors axially away from the other end connector after they are disconnected, prior to rotating the pivotal linkage assemblies to move the separated end connectors upwardly and out of the housing.

17. The method as claimed in claim 15, wherein the steps of disconnecting the end connectors and moving them into the raised position, and securing the end connectors to third and fourth cables, are carried out underwater by an ROV.

18. The method as claimed in claim 15, including the step of opening a hatch on the housing to provide access to the connectors and pivotal linkages prior to disconnecting said connectors.

* * * * *